(12) United States Patent
Miller

(10) Patent No.: US 7,054,524 B2
(45) Date of Patent: May 30, 2006

(54) ASYMMETRIC PHOTONIC CRYSTAL WAVEGUIDE ELEMENT HAVING SYMMETRIC MODE FIELDS

(75) Inventor: Robert O. Miller, Rochester, MI (US)

(73) Assignee: Energy Conversion Devices, Inc., Rochester Hills, MI (US)

(*) Notice: Subject to any disclaimer, the term of this patent is extended or adjusted under 35 U.S.C. 154(b) by 0 days.

(21) Appl. No.: 10/929,930

(22) Filed: Aug. 30, 2004

(65) Prior Publication Data

US 2006/0045454 A1 Mar. 2, 2006

(51) Int. Cl.
G02B 6/02 (2006.01)
G02B 6/10 (2006.01)

(52) U.S. Cl. ........................................ 385/28; 385/129

(58) Field of Classification Search ................. 385/128, 385/129
See application file for complete search history.

(56) References Cited

U.S. PATENT DOCUMENTS

| | | | |
|---|---|---|---|
| 6,640,034 B1* | 10/2003 | Charlton et al. | 385/122 |
| 2004/0109644 A1* | 6/2004 | Assefa et al. | 385/39 |
| 2004/0156610 A1* | 8/2004 | Charlton et al. | 385/129 |
| 2005/0105869 A1* | 5/2005 | Forbes et al. | 385/132 |
| 2005/0118420 A1* | 6/2005 | Kim et al. | 428/364 |

* cited by examiner

Primary Examiner—Kaveh Kianni
(74) Attorney, Agent, or Firm—Kevin L. Bray; Marvin S. Siskind

(57) ABSTRACT

A slab photonic crystal waveguide that preserves the parity of guided modes. The waveguide includes a photonic crystal layer interposed between two dielectric layers. The photonic crystal layer includes a periodic arrangement of asymmetrically shaped dielectric regions within a surrounding dielectric material. The waveguide precludes conversion of the state of parity of an introduced input mode by maintaining a symmetric mode field distribution. A symmetric mode field distribution is attained through variations in the dielectric constants of the dielectric layers that compensate for asymmetric mode localization tendencies associated with the asymmetric periodically arranged dielectric regions within the photonic crystal layer.

18 Claims, 6 Drawing Sheets

ASYMMETRIC PHOTONIC CRYSTAL WAVEGUIDE ELEMENT HAVING SYMMETRIC MODE FIELDS

FIELD OF INVENTION

This invention pertains to an element for waveguiding electromagnetic radiation. More particularly, this invention relates to a slab waveguide element that confines electromagnetic radiation laterally in a photonic crystal layer and vertically through index guiding. Most particularly, this invention relates to a structurally asymmetric waveguide element that preserves the symmetry of guided modes.

BACKGROUND OF THE INVENTION

Attention recently has been focused on developing materials capable of controlling the propagation of light in much the same way that semiconductors control the propagation of electrons. Over the past decade substantial progress has been made toward this goal and the new field of photonic crystals has emerged. A photonic crystal functions as a semiconductor for light in the sense that it possesses a photonic band gap that defines a range of electromagnetic frequencies that are unable to propagate in the crystal in one or more directions.

The ability of semiconductors to control the propagation of electrons originates from the periodic lattice arrangement of the atoms that constitute the semiconductor. The precise arrangement and spacing of atoms ultimately dictates the electronic potential that underlies the band structure, bandgap and electronic states of a semiconductor. Periodicity is also used in photonic crystals to achieve a photonic bandgap and to control the density of photonic states at different frequencies. Instead of a periodic electronic potential originating from periodically arranged atoms, however, periodicity of the refractive index originating from a periodic arrangement of one dielectric medium within another underlies the formation of a photonic bandgap. Since electromagnetic radiation of interest in photonic applications has a longer wavelength than the electrons confined in a semiconductor, the periodic spacing of the refractive index variation in a photonic crystal is larger than the periodic spacing of atoms in a semiconductor. When a photonic bandgap forms, the wavelengths of electromagnetic radiation within the bandgap are those that are comparable to the periodic spacing in refractive index. Electromagnetic radiation having an energy within the photonic band gap and propagating in a direction defined by the photonic band gap is blocked and unable to propagate in a photonic crystal. When external light having an energy and direction of propagation within the photonic band gap is made incident to a photonic crystal, it is unable to propagate through the crystal. Instead, it is perfectly reflected. Light with an energy or direction of propagation outside of the photonic band gap, on the other hand, freely passes through the crystal (subject, of course to ordinary absorption and reflection processes). This feature makes photonic crystals essentially perfect reflectors of incident wavelengths that are within the wavelength range and range of propagation directions encompassed by the photonic bandgap.

An example of a practical photonic crystal would be a material that consists of a flat dielectric slab that contains a periodic arrangement of holes extending in the thin direction and aligned along the lateral dimensions of the slab. Such a material may be viewed as a periodic arrangement of rods comprised of air and corresponds to a photonic crystal in which air is the macroscopic dielectric medium and the slab is the surrounding medium. Another example of a photonic crystal would be a periodic array of cylindrically shaped rods made of a dielectric material supported by a substrate with the space between the rods being filled by air or a dielectric material other than the one from which the rods are made. In this example, the rods correspond to the periodically distributed macroscopic dielectric medium and the material filling the space between the rods corresponds to the surrounding matrix. The precise details of the periodic pattern of rods (or other shape) and the refractive index contrast between the periodic macroscopic dielectric medium and its surroundings influences the properties of the photonic crystal.

Photonic crystals can be formed from a wide variety of macroscopic dielectric media provided that an appropriate refractive index contrast with a surrounding medium can be achieved. As an example, the composition of the holes or rods in the example above is not limited to air. Other materials that present a sufficiently large refractive index contrast with the surrounding flat dielectric slab may be used to form the rods. A periodic lattice of air holes, for example, may be drilled in a flat dielectric slab and subsequently filled with another material to form a photonic crystal. The rod material may have a higher or lower refractive index than the slab material. As another example, a periodic array of rods comprised of a macroscopic dielectric medium such as silicon in air as the surrounding medium represents a photonic crystal.

Important material design considerations include the size, spacing and arrangement of macroscopic dielectric media within a volume of surrounding material as well as the refractive indices of the dielectric and surrounding materials. The periodicity of the macroscopic dielectric media can extend in one, two or three dimensions. These considerations influence the magnitude of the photonic band gap, the frequency range of light or other electromagnetic energy (e.g. infrared, microwave etc.) that falls within the photonic band gap and whether the photonic band gap is full (in which case the photonic band gap effect is manifested regardless of the direction of propagation of the incident light) or partial (in which case the photonic band gap effect is manifested for some, but not all, directions of propagation). Other practical considerations are also relevant such as manufacturability, cost, ability to fabricate a periodic array of rods etc. Effects analogous to doping or defects in semiconductors may also be realized in photonic crystals. An inherent consequence of dopants or defects in semiconductors is a disruption or interruption of the periodicity of the lattice of atoms that constitute the semiconductor. The electronic states associated with dopants or defects are a direct consequence of the local disturbance in periodicity imparted to the semiconductor lattice. Photonic crystals can similarly be perturbed in ways analogous to introducing dopants and defects in semiconductors. Defects can be used to spatially confine light within a photonic crystal. A point defect can be used to localize electromagnetic radiation having a wavelength within the photonic bandgap. This occurs because the localized electromagnetic radiation is unable to escape from the defect due to its inability to propagate into or through the surrounding photonic crystal by virtue of the fact that the localized wavelength is within the photonic bandgap. Linear and planar defects can similarly be used to confine electromagnetic radiation in one or two dimensions within a photonic crystal.

The periodicity of a photonic crystal is a consequence of a regular and ordered arrangement of macroscopic dielectric media within a surrounding medium. Effects that interrupt the arrangement of macroscopic dielectric media can be used to break the periodicity to create localized or extended defect photonic states within the photonic band gap. Defects can be formed in rod array photonic crystals, for example, by perturbing one or more of the rods with respect to other rods in an array. Possible ways of perturbing rods in a surrounding dielectric slab, for example, include varying the size, position, optical constants, chemical composition of one or more rods or forming rods from two or more materials. Perturbation of a single rod provides a point defect that can be used to localize light. Perturbation of a row of rods provides a linear defect that acts to confine light in a channel. Such defects can be used to efficiently transfer light through the crystal without losses.

As the field of photonic crystals develops, the need for new photonic band gap materials is increasing. An important potential area of application for photonic crystals is waveguiding. In an ideal waveguide, a propagating beam of electromagnetic radiation is totally confined to a direction dictated by the waveguide. A three-dimensional photonic crystal offers an approach for achieving total confinement and lossless propagation of light. Waveguiding can be achieved in a three-dimensional photonic crystal by including a linear defect in the interior of the crystal. Light localized in the defect is confined to the defect if the wavelength is within the photonic bandgap of the surrounding photonic crystal. This occurs because the light is unable exit the defect and enter the surrounding photonic crystal. Three-dimensional photonic crystals are desirable for waveguiding applications because the photonic bandgap is complete in the sense that the effects of the photonic bandgap effects are manifest regardless of the direction of propagation of the light having a wavelength within the gap. Full three-dimensional confinement by the photonic bandgap over a full range of propagation directions is achievable and transmission losses are avoided. Three-dimensional photonic crystals are thus a highly valuable target for compact integrated optics systems which necessarily require sharp bends to minimize system size. In the absence of a three-dimensional photonic bandgap, prohibitive losses would occur at bends as the propagating light travels in a direction that fall outside of the bandgap.

A current outstanding problem, however, is the practical difficulty of achieving a full three-dimensional photonic crystal. A complete photonic bandgap requires the construction of a three-dimensional photonic crystal. The exacting requirements for periodically arranging macroscopic dielectric objects having a size on the order of the wavelength of propagating light has proven to be both challenging and costly.

A need exists for photonic crystals whose performance approaches that expected for three-dimensional photonic crystals and whose manufacture is less demanding. One solution that has been proposed is the slab photonic crystal. A slab photonic crystal includes a photonic crystal layer having a finite thickness and including a periodic array in two dimensions of one dielectric material within a surrounding dielectric material having a different composition. The layered structure of the slab photonic crystal makes its construction amenable to widely available layered deposition and processing techniques.

Periodicity in a slab photonic crystal occurs in the two lateral (in the plane of slab) dimensions, but is absent in the direction normal to the slab (i.e. thickness direction). Since a photonic crystal layer of this type is not periodic in three dimensions, it lacks a complete bandgap. This means that the photonic bandgap is operable with respect to included wavelengths only over a particular range of propagation directions. Wavelengths that are nominally within the bandgap are excluded from the bandgap for directions of propagation that fall outside of those encompassed by the bandgap. In this sense, the confinement of light by a defect in a photonic crystal layer is incomplete since the confinement is effective only for a limited range of propagation directions.

In a slab photonic crystal, the confinement of light is made complete by interposing a photonic crystal layer between two lower index dielectric cladding layers. The purpose of the cladding layers is to provide conventional index confinement of light that falls outside of the photonic bandgap of the photonic crystal layer. In this way, light can be maintained within the combination of layers without incurring substantial losses. The slab photonic crystal layer provides confinement for lateral propagation directions (directions of periodicity of the photonic crystal layer), while the cladding layer provides confinement in the slab normal direction.

A practical problem commonly encountered in the fabrication of slab photonic crystals is an asymmetry in the shape of the periodically arranged dielectric medium in the direction normal to the slab. In a typical example, the photonic crystal layer of a slab photonic crystal includes a periodic array of macroscopic rods comprised of a first dielectric material within a surrounding matrix of a second dielectric material. In the planar processing of such a photonic crystal layer, processing occurs by etching holes in a solid piece of the second (surrounding) dielectric material and subsequently filling these holes with the first dielectric material. Due to the nature of the etching process, the holes that form are not precisely cylindrical, but rather slightly conical or tapered so that the top of the hole is wider than the bottom part of the hole. The tapering is a consequence of the fact that the upper part of the hole is more readily accessed by the etchant, while the lower part of the hole is more difficult to access. Etching therefore occurs most efficiently at the top surface and becomes progressively less efficient due to inhibited access of the etchant away from the surface toward the bottom of the hole.

A consequence of the tapering is that the cross-sectional shape and/or area of the periodically arranged dielectric regions is non-uniform in the slab normal direction. This non-uniformity has a deleterious effect on waveguiding because it represents a destruction of mirror symmetry with respect to the mid-plane of the slab. This loss of symmetry leads to a mixing of guided modes of different parity and as a result, single mode waveguiding is precluded. Instead, mode coupling and multimode transmission occur with an accompanying increase in losses due to reflection. In order to improve the transmission efficiency of slab photonic crystals, it is desirable to devise a system that preserves mirror symmetry so that single mode operation can be achieved.

SUMMARY OF THE INVENTION

The instant invention provides a structurally asymmetric slab photonic crystal that preserves mode symmetry to permit single mode operation and efficient transmission of guided modes. The instant slab photonic crystal waveguide includes a photonic crystal layer having a periodic arrangement of discrete regions of a first dielectric material within a surrounding second dielectric material, where, in a preferred embodiment, the discrete regions of the first dielectric material are equivalent to each other with each having a tapered or otherwise non-uniform cross-section in the slab-normal direction. The photonic crystal layer is interposed between two dielectric cladding layers that differ in dielectric constant. The cladding layers provide confinement of guided modes in the slab-normal direction and the difference in dielectric constants of the cladding layers are selected in such a way that the cladding layers compensate for the asymmetry in the shape of the periodically arranged dielectric regions to provide for symmetric confinement of guided modes.

In a preferred embodiment, the photonic crystal layer includes a periodic arrangement in two dimensions of tapered rods having a substantially circular cross-section in planes aligned with the photonic crystal layer where the diameter of the circle varies in the slab-normal direction. The tapered rods are arranged within a surrounding dielectric material having a lower dielectric constant than the tapered rods. In this embodiment, the cladding layer adjacent to the narrower end of the tapered rod has a higher dielectric constant than the cladding layer adjacent to the wider end of the tapered rod.

DETAILED DESCRIPTION OF THE ILLUSTRATED EMBODIMENTS

Figure 1:
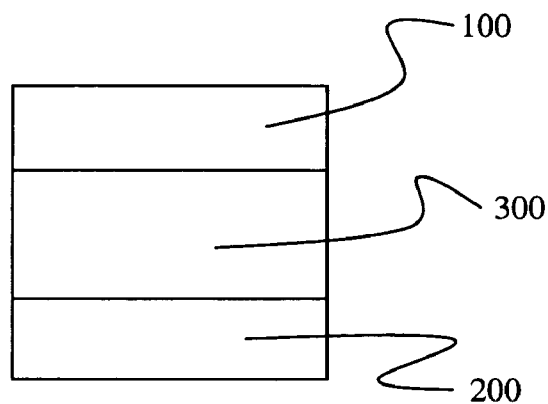
FIG. 1. Schematic depiction of a slab photonic crystal waveguide.

A schematic depiction of a slab photonic crystal waveguide in side view is provided in FIG. 1. The slab waveguide includes upper dielectric layer 100, lower dielectric layer 200 and photonic crystal layer 300. The z-direction indicated is a direction normal to the photonic crystal layer 300 and may be referred to herein as the slab-normal, normal, thickness or vertical direction. The lateral directions are included in the xy-plane (not shown) which is normal to the plane of the page of FIG. 1. The x and y directions may be referred to herein as the in-slab, horizontal or lateral directions. Confinement of guided modes in the in-slab directions is provided by the photonic bandgap and confinement of guided modes in the slab-normal direction is provided by the dielectric layers 100 and 200. The dielectric layers 100 and 200 may also be referred to herein as cladding layers. Confinement in the slab-normal direction requires that the dielectric constants of the cladding layers be less than the dielectric constant of the photonic crystal layer.

In an idealized slab photonic crystal waveguide, discrete regions of a first dielectric material are periodically arranged in two dimensions within a surrounding matrix of a second dielectric material where the periodically arranged discrete regions are identical in shape and size. The discrete regions are arranged periodically in the two in-slab directions and extend continuously in the slab-normal direction between the upper and lower cladding layers. In order to preserve mode symmetry, the upper and lower cladding layers have the same dielectric constant and the periodically arranged discrete regions have a shape that is symmetric with respect to the mid-plane of the photonic crystal layer. (The mid-plane of the photonic crystal layer is the plane that passes through the photonic crystal layer and is located halfway between the upper and lower surfaces of the photonic crystal layer. In the slab photonic crystal waveguide shown in FIG. 1, for example, the mid-plane of the photonic crystal layer is a horizontal plane that bisects the photonic crystal layer.)

Figure 2A:
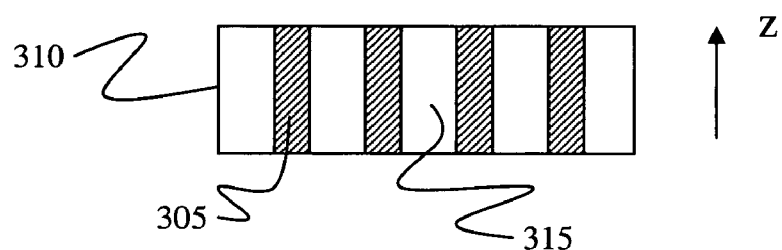
FIG. 2A. Side view of a photonic crystal layer.
Figure 2B:
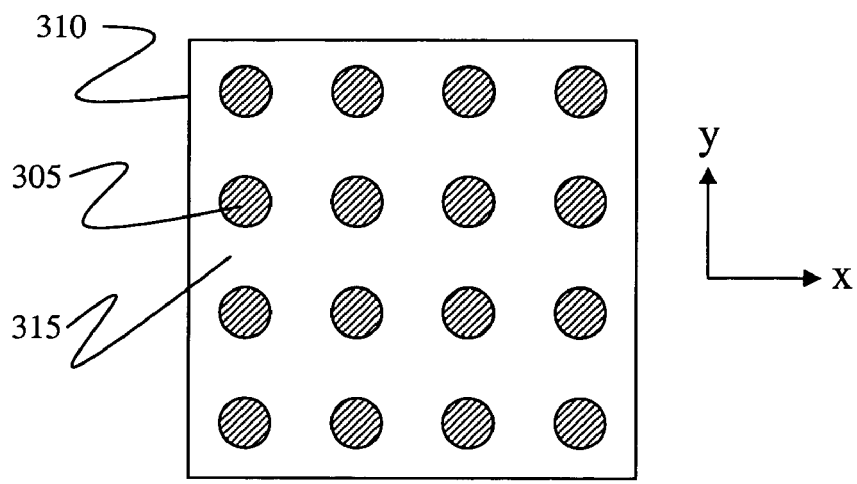
FIG. 2B. Top view of a photonic crystal layer.

In FIG. 2A is depicted in side view an enlargement of a representative embodiment of a photonic crystal layer for an idealized slab photonic crystal waveguide. In this embodiment, the photonic crystal layer 310 includes periodically arranged dielectric regions 305 surrounded by dielectric material 315. A top view of the idealized photonic crystal layer is shown in FIG. 2B. The top view shows the periodic arrangement of dielectric regions 305 within the surrounding dielectric material 315. The top view represents the perspective of the xy-planes (in slab planes; planes normal to the slab normal direction). The bottom view of the dielectric regions 305 matches the top view shown in FIG. 2B. The views shown in FIGS. 2A and 2B indicate that in this embodiment, the dielectric regions 305 are rods having a cylindrical shape that is symmetric with respect to the mid-plane of the photonic crystal layer 310.

Figure 2C:
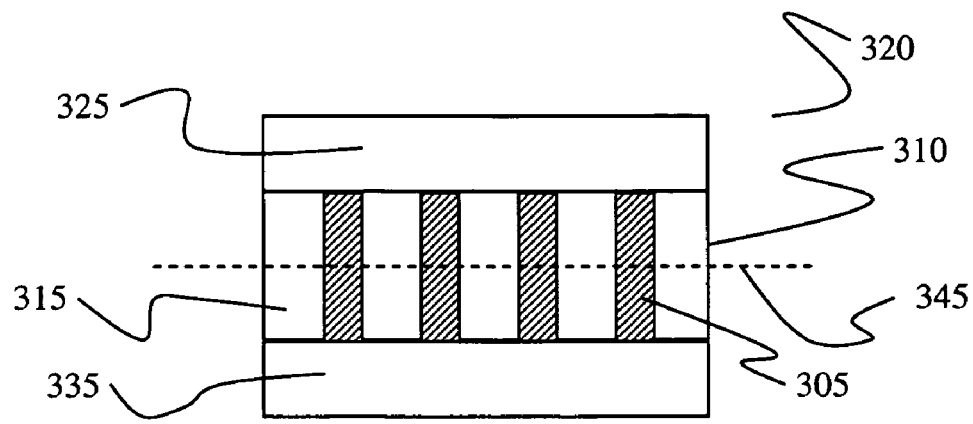
FIG. 2C. Side view of a slab photonic crystal waveguide.

FIG. 2C shows a side view of a slab photonic crystal waveguide 320 that includes the photonic crystal layer 310 depicted in FIGS. 2A and 2B. In addition to photonic crystal layer 310 which includes symmetric rod-shaped dielectric regions 305 periodically distributed within surrounding dielectric material 315, the slab waveguide further includes an upper dielectric layer 325 and a lower dielectric layer 335. Upper and lower dielectric layers 325 and 335 may also be referred to as cladding layers. Mid-plane 345 is also shown and corresponds to a plane that horizontally bisects photonic crystal layer 310. Mid-plane 345 is located halfway between the interface of the photonic crystal layer 310 with the upper dielectric layer 325 and the interface of the photonic crystal layer 310 with the lower dielectric layer 335. Mid-plane 345 is parallel to the upper dielectric layer 325 and lower dielectric layer 335. The symmetry of the rod-shaped dielectric regions 305 with respect to mid-plane 345 is evident in FIG. 2C. The symmetry can be viewed in terms of a mirror symmetry in which a reflection of the portion of the rod-shaped regions 305 above mid-plane 345 through mid-plane 345 maps that upper portion into the lower portion (the portion below mid-plane 345) of the rod-shaped regions 305. Symmetry with respect to mid-plane 345 can also be viewed in terms of a superimposability of the upper portion of rod-shaped regions 305 on the lower portion of rod-shaped regions 305. Periodically arranged dielectric regions that possess superimposability of the portions above and below the mid-plane are symmetric, while periodically arranged dielectric regions that lack superimposability with respect to the mid-plane are asymmetric.

Mode localization within the slab photonic crystal waveguide 320 depends on the relative values of the dielectric constants of the different regions of the waveguide. In principle, different materials can be used for the symmetric rod-shaped regions 305, surrounding dielectric material 315, upper dielectric layer 325 and lower dielectric layer 335. As a result, the relative dielectric constants of the different regions can be varied in a number of ways to control the mode field distribution within the waveguide. In the instant invention, it is preferred to confine guided modes within the photonic crystal layer 310 and to achieve lateral (horizontal) confinement through the photonic bandgap of the photonic crystal layer 310 and slab-normal (vertical) confinement through the upper and lower dielectric layers 325 and 335.

Within the photonic crystal layer 310, the dielectric constant of the symmetric rod-shaped regions 305 can be greater than or less than the dielectric constant of the surrounding dielectric material 315. The guided mode will preferentially localize in whichever region has the higher dielectric constant. By insuring that the upper and lower dielectric layers 325 and 335 have a lower dielectric constant than the regions (symmetric rod-shaped regions 305 vs. surrounding dielectric region 315) within the photonic crystal layer in which the mode is localized, confinement in the slab-normal (vertical) direction is achieved.

By requiring the cladding layers 325 and 335 to have the same dielectric constant, the guided mode supported within the photonic crystal layer 310 has a mode field distribution that is symmetric with respect to an internal plane of mirror symmetry that coincides with the horizontal mid-plane 345 of the waveguide structure. Depending on which of the symmetric rod-shaped regions 305 or surrounding dielectric region 315 has the higher dielectric constant, the mode field distribution of the supported mode can have even (dielectric constant of regions 315>dielectric constant of regions 305) or odd (dielectric constant of regions 305>dielectric constant of regions 315) parity with respect to the internal plane of symmetry.

Figure 2D:
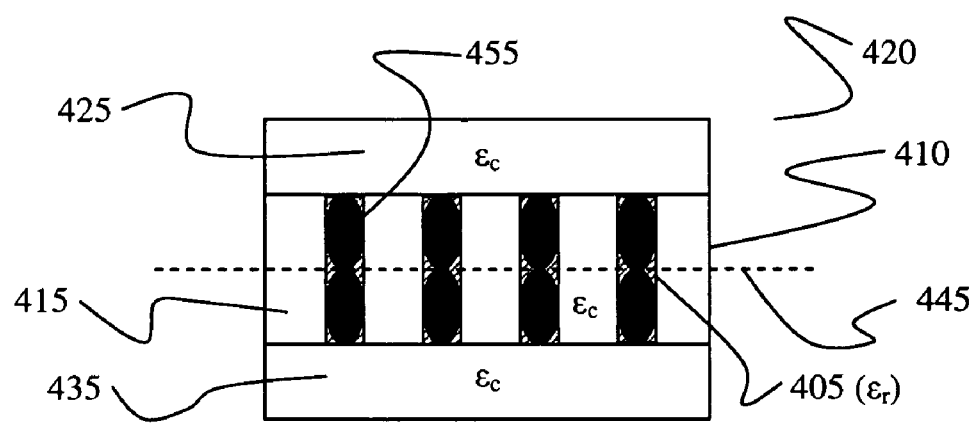
FIG. 2D. Mode field distribution within a slab photonic crystal waveguide in side view.

FIG. 2D shows the mode field distribution in side view for an embodiment 420 of the slab photonic crystal waveguide depicted in FIG. 2C. In this embodiment, the dielectric constants of the upper dielectric layer 425 and lower dielectric layer 435 are equal and are designated $\epsilon_c$. The upper and lower dielectric layers 425 and 435 may also be referred to as cladding layers. The dielectric constant of the surrounding dielectric regions 415 is also chosen to be $\epsilon_c$, while the dielectric constant of the symmetric rod-shaped dielectric regions 405 is chosen to be $\epsilon_r$, where $\epsilon_r > \epsilon_c$. The mode field distribution 455 shows the spatial distribution of the electric field intensity of a guided mode supported by the slab photonic crystal. Since $\epsilon_r > \epsilon_c$, the mode field is concentrated in the rod-shaped regions 405. With the relative values of the dielectric constant chosen for this embodiment, the mode field distribution possesses odd parity with respect to the horizontal mid-plane of symmetry 445 that bisects photonic crystal layer 410. The mode field distribution 455 as depicted in FIG. 2D represents the primary area of localization of a mode supported by the slab photonic crystal. It is understood by persons of skill in the art that the mode field includes evanescent contributions that extend beyond the boundaries of the dielectric regions 405.

In the practical fabrication of slab photonic crystal waveguides, it is often difficult to maintain a symmetric shape for the periodically distributed dielectric regions included within the photonic crystal layer. In a typical fabrication process, the processing begins with depositing or otherwise forming a layer of the surrounding dielectric material of the photonic crystal layer onto the lower dielectric layer. In order to introduce the periodically arranged dielectric regions into the photonic crystal layer, it is necessary to remove portions of the layer of the surrounding dielectric material to create the spaces in which to add the periodically arranged dielectric regions. The goal in removing portions of the layer of the surrounding dielectric material is to create holes or cavities into which a second material can be added or deposited within the surrounding dielectric material to produce a photonic crystal layer. The holes must necessarily be periodically positioned and preferably are identical in size and shape. In order to achieve symmetrically shaped periodically arranged dielectric regions, it is necessary that the formation of holes or cavities within the layer of the surrounding dielectric material be uniform in the depth direction.

From a processing standpoint, a preferred method in many process environments for creating the holes is etching. By masking the top surface of the layer of surrounding dielectric material, a periodically arranged distribution of unmasked regions can be defined at the surface and these unmasked regions can be exposed to a suitable etchant to create holes or cavities within the layer of surrounding dielectric material. The masking can also be used to define the cross-sectional shape (e.g. circular, square, groove) of the holes or cavities that will be filled with a different dielectric material to provide the periodically arranged dielectric regions of the photonic crystal layer. In order to achieve symmetrically shaped holes (as would be necessary to form a slab photonic crystal waveguide such as that depicted in FIG. 2D), it is necessary that etching occur uniformly in the depth direction so that the cross-sectional shape and area remains constant in the depth direction. When these conditions are met, the individual dielectric regions in the periodic arrangement are symmetric with respect to a horizontal plane of symmetry that bisects the photonic crystal layer.

In practice, a uniform etch in the depth direction is difficult to achieve because of the differential in the time of exposure that occurs as a function of depth. The etching initiates at the top surface of the layer of surrounding dielectric material and continues into the interior of that layer toward the interface with the lower dielectric material. As a result, the time of contact of the etchant is greatest at the top surface of the layer of surrounding dielectric material, progressively decreases in the depth direction away from the top surface, and is at a minimum at the interface with the lower dielectric material. The resulting differential in the time of exposure to the etchant in the depth direction tends to produce a tapered or otherwise asymmetric or non-uniform cavity cross-section as a function of depth in the layer of surrounding dielectric material. The cross-sectional shape and/or dimensions may vary in the depth direction and destroy the symmetry with respect to the horizontal plane described hereinabove.

In a typical situation, the cavities in which the periodically arranged dielectric regions are introduced are tapered and have a larger cross-section at the top surface of the layer of surrounding dielectric material (the surface that ultimately forms the interface with the upper dielectric layer) and a smaller cross-section at the bottom surface of the layer of surrounding dielectric material (the surface that forms the interface with the lower dielectric layer). Such cavities (and the periodically arranged dielectric materials that fill them)

lack symmetry with respect to the horizontal mid-plane of the photonic crystal layer and may be referred to herein as asymmetric cavities or asymmetric regions of periodically arranged dielectric materials or the like. A slab photonic crystal that contains asymmetrically shaped periodically arranged dielectric materials may be referred to herein as an asymmetric slab photonic crystal.

Figure 3A:
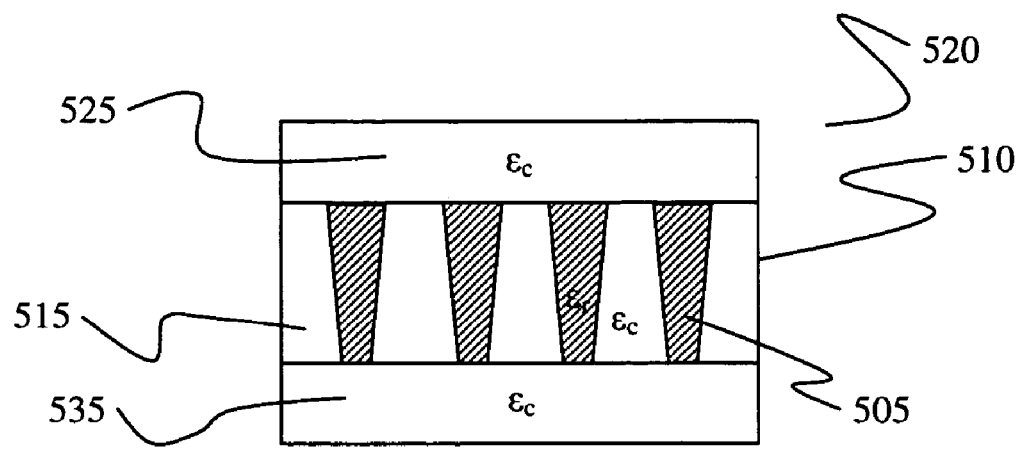
FIG. 3A. Side view of an asymmetric slab photonic crystal waveguide.

A representative example of an asymmetric slab photonic crystal is shown in side view in FIG. 3A. The asymmetric slab photonic crystal 520 includes upper dielectric layer 525, lower dielectric layer 535, and photonic crystal layer 510 that includes surrounding dielectric material 515 and periodically arranged dielectric regions 505. The upper and lower dielectric layers 525 and 535 may also be referred to as cladding layers. The periodically arranged regions 505 lack symmetry with respect to the mid-plane of photonic crystal layer 510 and are accordingly referred to as asymmetric. The dielectric constants of the upper dielectric layer 525, lower dielectric layer 535 and surrounding dielectric material 515 are selected to be equal and are designated $\epsilon_c$ in FIG. 3A. The dielectric constant of the periodically arranged regions 505 is designated $\epsilon_r$, where $\epsilon_r > \epsilon_c$ in the embodiment shown in FIG. 3A. The tapered shape of the periodically arranged dielectric regions 505 is evident and exemplifies the shapes resulting from typical etching processes.

Figure 3B:
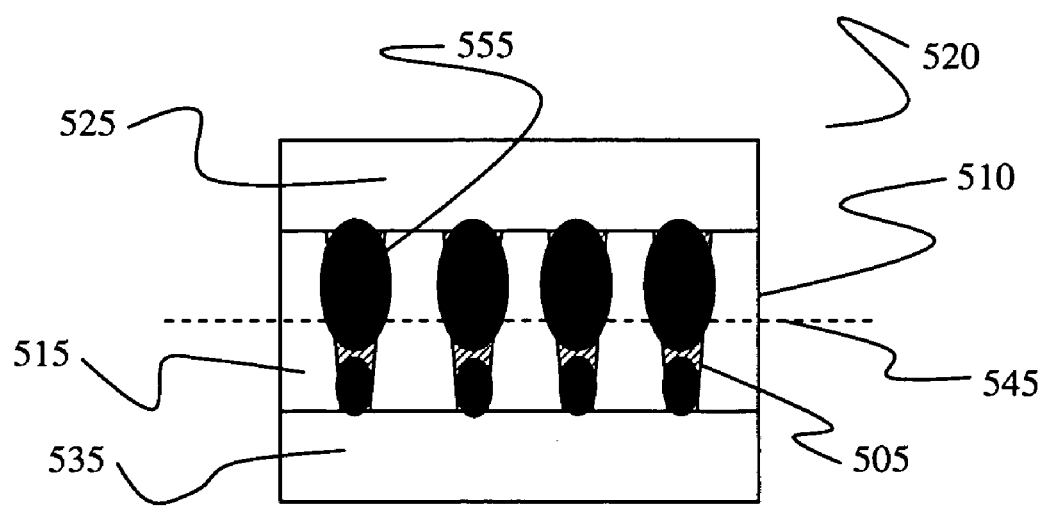
FIG. 3B. Mode field distribution within an asymmetric slab photonic crystal waveguide in side view.

The tapered, asymmetric shape of the periodic dielectric regions 505 influences the mode field distribution of guided modes supported by photonic crystal layer 510. Since the periodic dielectric regions 505 have a higher dielectric constant than the surrounding dielectric regions 515, the mode is preferentially localized in the periodic regions 505 and since the periodic regions 505 are asymmetric, the mode field distribution is asymmetric. The mode field preferentially localizes in the wider, upper portion of the periodic regions 505 and as a result, the mode field distribution is asymmetric with respect to a horizontal mid-plane of the photonic crystal layer 510. A schematic depiction of the mode field in side view for the embodiment shown in FIG. 3A is presented in FIG. 3B. The mode field 555 is preferentially localized in the upper, wider portion of periodic regions 505 and is asymmetric with respect to the horizontal mid-plane 545. The mode field distribution 555 as depicted in FIG. 3B represents the primary area of localization of a mode supported by the slab photonic crystal. It is understood by persons of skill in the art that the mode field includes additional evanescent contributions.

A deleterious consequence of mode field asymmetry is that the parity of guided modes is no longer purely even or purely odd as in the case of symmetric mode fields. Instead, both odd and even parity modes can be supported in the photonic crystal layer and a mixing or coupling of modes of different parity is possible. If a mode having a state of definite parity is introduced into an asymmetric slab photonic crystal, the crystal permits a conversion of the parity state into other parity states and the purity or definiteness of parity is lost. An even parity mode, for example, that is introduced into an asymmetric slab photonic crystal can be transformed into an odd parity mode or a linear combination of even and odd parity modes. Instead of single mode transport through the crystal, multimode transport occurs as power from the entering mode is coupled into multiple modes that become sustainable in the crystal due to its asymmetric condition. As a result, the power of a pure mode (a mode having a pure or definite state of parity) is redistributed to multiple modes and the transmitted power in the initial mode state is significantly reduced. In effect, the presence of asymmetry operates as a source of power loss with respect to a particular state of mode parity through mode coupling to other parity states.

The instant invention provides a slab photonic crystal that preserves mode parity in the face of asymmetric periodically arranged dielectric regions in the photonic crystal layer. The instant slab photonic crystal provides a compensation mechanism that acts to offset the preferential localization of mode field that occurs in the wider, high cross-sectional area portion of tapered or otherwise asymmetric periodically arranged dielectric regions. Compensation is effected through an independent mechanism of varying mode field localization that is produced by including upper and lower dielectric layers in an asymmetric slab photonic crystal that have different dielectric constants. By tailoring the relative values of the dielectric constants of the upper and lower dielectric layers, an asymmetry in dielectric constant adjacent to the photonic crystal layer is created that offsets the asymmetry in mode field distribution resulting from tapered or otherwise non-uniform periodic dielectric regions. Through this compensation mechanism, a symmetric mode field distribution is achievable in a slab photonic crystal that includes periodically arranged dielectric regions that are asymmetric.

Figure 4A:
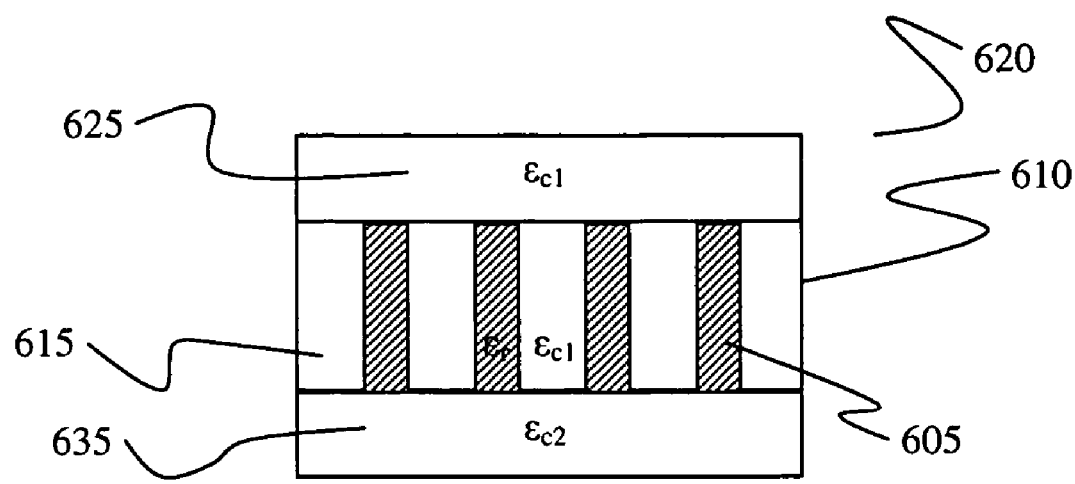
FIG. 4A. Side view of a slab photonic crystal including upper and lower dielectric layers having different dielectric constants.

An illustration of the effect of a differential in the dielectric constants of the upper and lower dielectric layers of a slab photonic crystal is shown in side view in FIG. 4A. The photonic crystal 620 includes upper dielectric layer 625, lower dielectric layer 635, and photonic crystal layer 610 that includes surrounding dielectric material 615 and periodically arranged dielectric regions 605. The upper and lower dielectric layers 625 and 635 may also be referred to as cladding layers. The dielectric constants of the upper dielectric layer 625 and surrounding dielectric material 615 are selected to be equal and are designated $\epsilon_{c1}$. The dielectric constant of the periodically arranged regions 605 is designated $\epsilon_r$. The dielectric constant of the lower dielectric layer 635 is designated $\epsilon_{c2}$, where the relative values of the dielectric constants are $\epsilon_r > \epsilon_{c2} > \epsilon_{c1}$. This relative ordering maintains vertical confinement and further permits an additional degree of freedom in controlling mode field distribution within the photonic crystal layer 610.

Figure 4B:
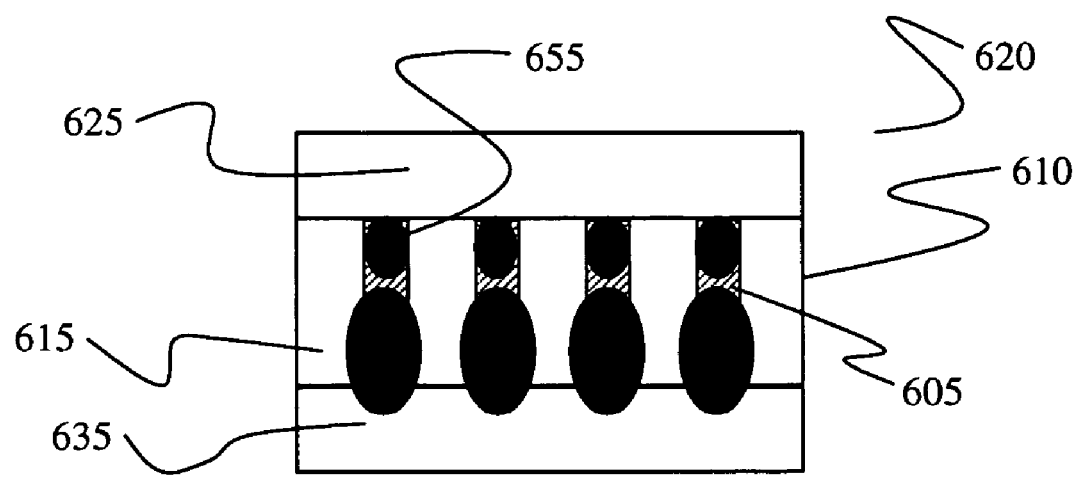
FIG. 4B. Side view of the mode field distribution within a slab photonic crystal that includes upper and lower dielectric layers having different dielectric constants.

In the embodiment of FIG. 4A, the periodic regions 605 are symmetric, but the different dielectric constants of the upper and lower dielectric layers 625 and 635 lead to a deviation of the mode field distribution relative to the symmetric distribution shown in FIG. 2D hereinabove. The mode field distribution 655 of the slab photonic crystal shown in FIG. 4A is depicted in side view in FIG. 4B, where it is shown that the mode field distribution 655 becomes asymmetric and biased in the direction of the lower dielectric layer. The mode field distribution 655 as depicted in FIG. 4B represents the primary area of localization of a mode supported by the slab photonic crystal. It is understood by persons of skill in the art that the mode field includes additional evanescent contributions.

The higher dielectric constant of the lower dielectric layer relative to the upper dielectric layer induces an asymmetry in the mode field distribution 655 and causes the mode field preferentially localizes in the lower portion of the periodic regions 605. The greater the differential in the dielectric constants of the upper and lower dielectric layers is, the greater is preference of the mode field to localize in the vicinity of the dielectric layer having the higher dielectric constant. The degree of asymmetry of the mode field distribution may thus be continuously varied and controlled by adjusting the differential in the dielectric constants of the upper and lower dielectric layers of a slab photonic crystal.

The mode field distribution 655 depicted in FIG. 4B lacks symmetry with respect to an internal horizontal plane of the photonic crystal layer 610. As a result, mode purity is not preserved in the slab photonic crystal 620. Instead, modes of even and odd parity are mixed or coupled by the slab photonic crystal 620 and a mode having a definite state of parity suffers a significant power loss upon introduction into the slab photonic crystal 620 as the mode power is redistributed into other modes having different states of parity or linear combinations thereof.

The examples shown in FIGS. 4A and 4B demonstrate that variations in the relative dielectric constants of the upper and lower dielectric layers can be used as an independent mechanism for influencing the mode field localization. In the instant invention, asymmetric slab photonic crystals are provided in which mode field asymmetry produced by asymmetric periodically arranged dielectric regions within the photonic crystal layer are offset by a compensating mode field asymmetry produced through a variation in the relative values of the dielectric constants of the upper and lower dielectric layers.

Figure 5A:
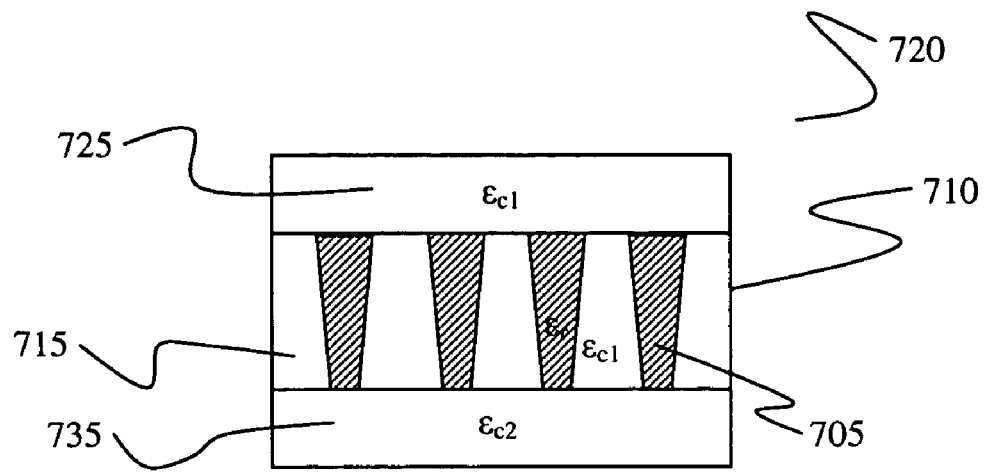
FIG. 5A. Side view of an asymmetric slab photonic crystal including upper and lower dielectric layers having different dielectric constants.

As shown in FIG. 3B hereinabove, the presence of asymmetrically shaped periodically arranged dielectric regions leads to a preferential localization of the mode field in the wider portion of tapered periodically arranged dielectric regions. The slab photonic crystal shown in FIG. 4B indicates that mode field localization can be independently biased in the direction of the dielectric layer having the higher dielectric constant. FIG. 5A shows an embodiment in side view of the instant invention that utilizes a differential in the dielectric constants of the upper and lower dielectric layers to offset or compensate an asymmetry in mode field distribution that results from asymmetrically shaped periodically arranged dielectric regions in the photonic crystal layer of a slab photonic crystal. The slab photonic crystal 720 includes upper dielectric layer 725, lower dielectric layer 735, and photonic crystal layer 710 that includes surrounding dielectric material 715 and periodically arranged dielectric regions 705. The upper and lower dielectric layers 725 and 735 may also be referred to as cladding layers. The dielectric constants of the upper dielectric layer 725 and surrounding dielectric material 715 are selected to be equal and are designated $\epsilon_{c1}$. The dielectric constant of the periodically arranged regions 705 is designated $\epsilon_r$. The dielectric constant of the lower dielectric layer 735 is designated $\epsilon_{c2}$, where the relative values of the dielectric constants are $\epsilon_r > \epsilon_{c2} > \epsilon_{c1}$. This relative ordering maintains vertical confinement and further permits an additional degree of freedom in controlling mode field distribution within the photonic crystal layer 710.

Figure 5B:
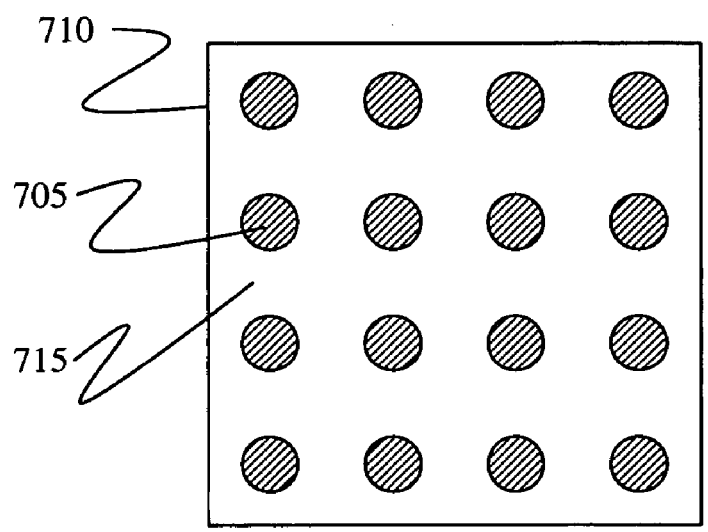
FIG. 5B. Top view of the photonic crystal layer of the embodiment shown in FIG. 5A.
Figure 5C:
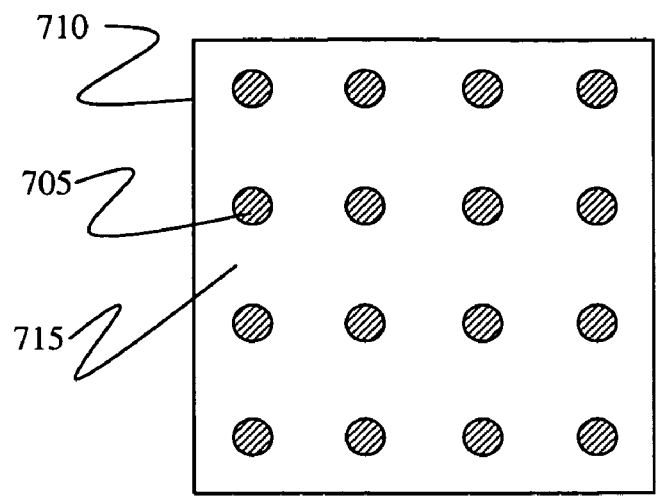
FIG. 5C. Bottom view of the photonic crystal layer of the embodiment shown in FIG. 5A.

The top and bottom views of the photonic crystal layer 710 are shown in FIGS. 5B and 5C, respectively. Each of the views includes photonic crystal layer 710 along with the periodically arranged dielectric regions 705 and surrounding dielectric regions 715. The cross-section of periodically arranged regions 705 is larger in the top view shown in FIG. 5B than in the bottom view shown in FIG. 5C due to the asymmetric, tapered shape of periodically arranged dielectric regions 705.

Figure 5D:
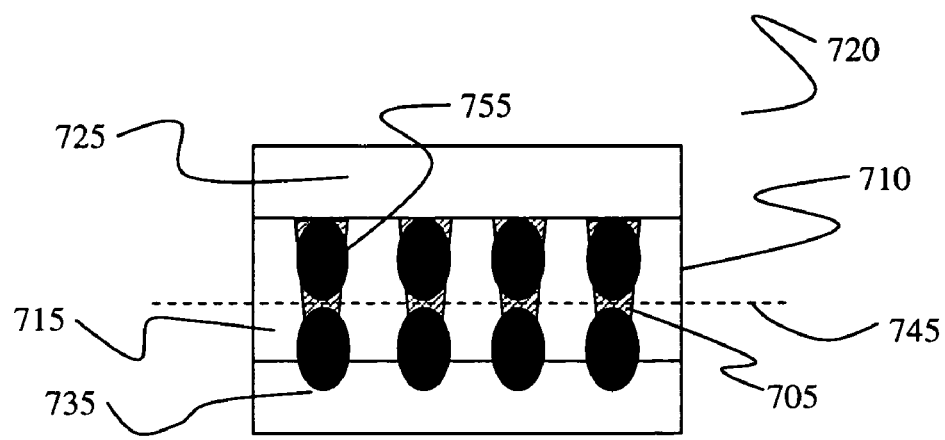
FIG. 5D. Side view of the mode field distribution within an asymmetric slab photonic crystal that includes upper and lower dielectric layers having different dielectric constants.

The mode field distribution of the embodiment depicted in FIGS. 5A, 5B and 5C is shown in side view in FIG. 5D. FIG. 5D shows slab photonic crystal 720, upper dielectric layer 725, lower dielectric layer 735, photonic crystal layer 710, periodically arranged regions 705, and surrounding dielectric regions 715. FIG. 5D further shows mode field distribution 755 and horizontal plane 745. The mode field distribution 755 as depicted in FIG. 5D represents the primary area of localization of a mode supported by the slab photonic crystal. It is understood by persons of skill in the art that the mode field includes additional evanescent contributions.

The mode field 755 is symmetrically distributed about horizontal plane 745, with equal localization of the mode field 755 above and below the plane 745. The plane of symmetry 745 is contained within the photonic crystal layer 710, but is displaced from the mid-plane location. As shown in FIG. 5D, the plane of symmetry 745 in this embodiment is located closer to lower dielectric layer 735 than to upper dielectric layer 725. The displacement of the plane of symmetry 745 in the direction of the lower dielectric layer 735 is due to the higher dielectric constant of the lower dielectric layer 735 relative to the upper dielectric layer 725.

Mode field 755 is symmetrically localized about symmetry plane 745. Symmetry of the mode field distribution 755 is a consequence of a balancing of effects related to the asymmetric shape of the periodically arranged dielectric regions 705 and the differential in dielectric constant between the upper dielectric layer 725 and lower dielectric layer 735. The tendency of the mode field to localize in the wider portion of the tapered periodically arranged dielectric regions of the photonic crystal layer is offset by the tendency of the mode field to localize in the vicinity of the higher dielectric constant lower dielectric layer. By adjusting the difference in the dielectric constants of the upper and lower dielectric layers of a slab photonic crystal appropriately relative to the asymmetry in the shape of the periodically arranged dielectric regions, the slab photonic crystal can be made to support a symmetric mode field. Preservation of the symmetry of the mode field distribution about a plane of symmetry is achieved and prevents the mixing or coupling of modes. As a result, a slab photonic crystal having asymmetrically shaped periodically arranged can maintain the purity of the state of parity of a guided mode utilizing the instant invention. A mode having a definite state of parity (e.g. an even mode or an odd mode) retains its parity as it is guided through the embodiment depicted in FIGS. 5A–5D and does not suffer power losses due to dissipation of energy into other modes.

The embodiment depicted in FIGS. 5A–5D is illustrative of the general principles of the instant invention. The instant invention provides slab photonic crystals that include asymmetrically shaped periodically arranged dielectric regions while providing for symmetric mode field distributions due to a compensating mode localization effect provided by a difference in the dielectric constants of the upper and lower dielectric layers. Symmetry of the mode field distribution is with respect to an internal plane of the photonic crystal layer, where the internal plane may or may not coincide with the mid-plane of the photonic crystal layer.

A preferred embodiment of the instant invention is one in which the surrounding dielectric material and the periodically arranged dielectric regions of the photonic crystal layer are comprised of solid dielectric materials. In another preferred embodiment, the surrounding dielectric material is a solid dielectric material and the periodically arranged regions are comprised of a gas (e.g. air), so that the instant invention includes embodiments in which the photonic crystal layer includes a periodic arrangement of holes (dielectric regions filled with air or another gas) within a surrounding solid dielectric material. Additional embodiments of the instant invention include embodiments in which the periodically arranged dielectric regions and/or the surrounding dielectric material are liquid dielectric materials.

As indicated hereinabove, depending on the relative values of the dielectric constants of the periodically arranged dielectric regions and the surrounding dielectric material of the photonic crystal layer, the guided mode supported by the instant slab photonic crystal waveguide may be preferentially localized in either the periodically arranged dielectric regions or the surrounding dielectric material. In an embodiment that includes a periodic arrangement of holes within a surrounding solid dielectric material, the mode field will preferentially localize in the surrounding dielectric material. In such an embodiment, if the holes are tapered downward (i.e. the holes have a larger cross-section at the interface with the upper dielectric layer than at the interface with the lower dielectric layer), the regions of surrounding dielectric material necessarily have a greater cross-sectional area at the interface with the lower dielectric layer than at the interface with the upper dielectric layer and as a result, the supported mode will preferentially localize in the portion of the surrounding dielectric material in closer proximity to the lower dielectric layer. In this embodiment, the compensation effect described hereinabove is thus achieved by increasing the dielectric constant of the upper dielectric layer relative to the dielectric constant of the lower dielectric layer.

Although the embodiments described hereinabove have considered periodically arranged dielectric regions having a circular cross-section, the principles of the instant invention extend generally to asymmetrically-shaped periodically arranged dielectric regions of any cross-sectional shape, including triangular, square, rectangular, elliptical, oval, and polygonal. Asymmetric periodically arranged dielectric regions within the scope of the instant invention include regions having a cross section that varies in size or shape in the depth (thickness) direction of the photonic crystal layer. As described in the embodiment depicted in FIGS. 5A–5D, an example of an asymmetric dielectric region is a region that has a circularly shaped cross section that varies in size (diameter) in the thickness direction of the photonic crystal layer between the upper and lower dielectric layers. Asymmetric dielectric regions may be similarly formed from other cross sectional shapes. In other embodiments, the periodically arranged dielectric regions are asymmetric due to a change in cross sectional shape in the depth direction. The cross sectional shape of the periodically arranged dielectric region may be different at the interface of the photonic crystal layer with the lower dielectric layer than at the interface of the photonic crystal layer with the upper dielectric layer with a transformation from one cross sectional shape to the other cross sectional shape occurring within the photonic crystal layer.

The upper and lower dielectric layers of the instant slab photonic crystals can be homogeneous materials having a desired dielectric constant or a heterogeneous or composite material that has an average or effective dielectric constant that provides confinement and mode field localization effects in accordance with the instant invention. The upper and lower dielectric layers are comprised of a dielectric material. The dielectric material can be a solid (e.g. silica, glass, titania, silicon, etc.), a liquid (e.g. water or other polar liquid, a hydrocarbon or other non-polar liquid etc.) or a gas (e.g. air, nitrogen, argon, etc.).

Further embodiments of the instant invention include those in which the mode field is localized preferentially in the surrounding dielectric material rather than preferentially in the periodically arranged dielectric regions as described in the selected illustrative examples hereinabove. These embodiments are realized by including a surrounding dielectric material that has a higher dielectric constant than the periodically arranged dielectric regions of the photonic crystal layer, while maintaining confinement by the upper and lower dielectric layers.

Among the embodiments considered hereinabove are embodiments in which the parity of an odd parity mode supported by the instant slab photonic crystal waveguides is defined with respect to a single nodal plane. Further embodiments of the instant invention include slab photonic crystal waveguides that support symmetric even or odd modes, where mode parity is defined with respect to two or more nodal planes. In these further embodiments, the plane of symmetry of a symmetric even or odd parity mode field distribution may or may not coincide with a nodal plane.

The instant invention further includes a system for transmitting electromagnetic radiation that includes a source of electromagnetic radiation coupled to the instant slab photonic crystal waveguide where the source introduces electromagnetic radiation into the slab photonic crystal waveguide and the introduced electromagnetic radiation is guided through the waveguide by way of a symmetric mode field distribution. In a preferred embodiment the slab photonic crystal receives an incident electromagnetic beam having a particular state of parity and/or a particular mode field distribution and preserves that state of parity and/or mode field distribution as it guides the electromagnetic beam during transmission to produce an output electromagnetic beam having characteristics that substantially match the characteristics of the incident beam.

The disclosure and discussion set forth herein is illustrative and not intended to limit the practice of the instant invention. While there have been described what are believed to be the preferred embodiments of the instant invention, those skilled in the art will recognize that other and further changes and modifications may be made thereto without departing from the spirit of the invention, and it is intended to claim all such changes and modifications that fall within the full scope of the invention. It is the following claims, including all equivalents, in combination with the foregoing disclosure and knowledge commonly available to persons of skill in the art, which define the scope of the instant invention.

I claim:
1. A slab waveguide comprising
a first cladding layer having a first dielectric constant;
a photonic crystal layer formed on said first cladding layer, said photonic crystal layer including periodically arranged regions of a first dielectric material within a second dielectric material, each of said periodically arranged regions of said first dielectric material being asymmetric with respect to the mid-plane of said photonic crystal layer, said periodically arranged regions inducing an asymmetry in the mode field distribution of an optical signal propagating within said photonic crystal layer; and
a second cladding layer formed on said photonic crystal layer, said second cladding layer having a second dielectric constant, said second dielectric constant differing from said first dielectric constant;
wherein the difference between said first and second dielectric constants causes said first and second cladding layers to offset said asymmetry in said mode field distribution in said photonic crystal layer induced by said periodically arranged regions.

2. The waveguide of claim 1, wherein said periodically arranged dielectric regions have a circular cross-section.

3. The waveguide of claim 1, wherein said periodically arranged regions have a polygonal cross-section.

4. The waveguide of claim 1, wherein said periodically arranged regions are tapered.

5. The waveguide of claim 1, wherein the cross-sectional area of said periodically arranged dielectric regions varies between said first cladding layer and said second cladding layer.

6. The waveguide of claim 1, wherein the cross-sectional shape of said periodically arranged dielectric regions varies between said first cladding layer and said second cladding layer.

7. The waveguide of claim 1, wherein the dielectric constant of said first dielectric material is greater than the dielectric constant of said second dielectric material.

8. The waveguide of claim 1, wherein the dielectric constant of said second cladding layer is the same as the dielectric constant of said second dielectric material.

9. The waveguide of claim 1, wherein said periodically arranged dielectric regions extend continuously from said first cladding layer to said second cladding layer.

10. The waveguide of claim 1, wherein the mode field distribution supported by said waveguide is symmetric.

11. The wavtguide of claim 10, wherein the plane of symmetry of said mode field distribution coincides with the mid-plane of said photonic crystal layer.

12. The waveguide of claim 10, wherein said symmetric mode field has even parity.

13. The waveguide of claim 10, wherein said mode field distribution is preferentially localized in said periodically arranged dielectric regions.

14. An electromagnetic radiation transmission system comprising a source of electromagnetic radiation, said source producing an input electromagnetic beam; and the waveguide of claim 1, said waveguide receiving said input electromagnetic beam, said electromagnetic beam forming a guided mode in said wavegoide, said guided mode having a mode field distribution in said waveguide, said waveguide transmitting said guided mode to provide an output beam of electromagnetic radiation.

15. The transmission system of claim 14, wherein said mode field distribution of said output beam is symmetric.

16. The transmission system of claim 14, wherein said guided mode has even parity.

17. The transmission system of claim 14, wherein said output beam has the same parity as said input beam.

18. The transmission system of claim 15, wherein said mode field distribution of said input beam is symmetric.

* * * * *